(12) United States Patent
Lin

(10) Patent No.: US 9,329,722 B2
(45) Date of Patent: May 3, 2016

(54) CAPACITIVE TOUCH SYSTEM AND METHOD WITH AUTO-CALIBRATION

(75) Inventor: Guang-Huei Lin, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 291 days.

(21) Appl. No.: 13/413,369

(22) Filed: Mar. 6, 2012

(65) Prior Publication Data

US 2013/0234975 A1  Sep. 12, 2013

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ...... G06F 3/044; G06F 3/0488; G06F 3/0416
USPC .................................................. 345/173–174
See application file for complete search history.

(56) References Cited

U.S. PATENT DOCUMENTS

| | | | | |
|---|---|---|---|---|
| 6,452,521 B1 * | 9/2002 | Wang et al. | .................... | 341/139 |
| 7,571,065 B2 * | 8/2009 | Seesink | ............................ | 702/85 |
| 7,629,917 B2 * | 12/2009 | Shinohara | ...................... | 341/172 |
| 7,884,662 B1 * | 2/2011 | Chuang et al. | ................ | 327/337 |
| 7,920,134 B2 * | 4/2011 | Krah | ............................. | 345/178 |
| 2002/0149508 A1 * | 10/2002 | Hamashita | .................... | 341/172 |
| 2008/0309622 A1 * | 12/2008 | Krah | ............................. | 345/173 |
| 2009/0315858 A1 * | 12/2009 | Sato et al. | ...................... | 345/174 |
| 2012/0133594 A1 * | 5/2012 | Edwards et al. | .............. | 345/173 |
| 2012/0161994 A1 * | 6/2012 | Quiquempoix et al. | ...... | 341/143 |
| 2013/0257786 A1 * | 10/2013 | Brown | .................... | G06F 3/044 345/174 |
| 2015/0145535 A1 * | 5/2015 | Nys | ....................... | G06F 3/0418 324/679 |

FOREIGN PATENT DOCUMENTS

| TW | 200905538 | 2/2009 |
|---|---|---|
| TW | 200923744 | 6/2009 |

* cited by examiner

*Primary Examiner* — Christopher E Leiby
(74) *Attorney, Agent, or Firm* — Huffman Law Group, PC

(57) ABSTRACT

The present invention is directed to a capacitive touch system and method with auto-calibration. A driving signal generator provides driving signals to first electrodes, thereby resulting in induced signals on second electrodes. An induced signal receiver receives and processes the induced signals. The induced signals associated with at least some no-touch points are measured and pre-stored in an initial value generator, which, at the beginning of a measuring period, generates initial induced signals of the second electrodes according to the pre-stored induced signals for initializing the induced signal generator.

4 Claims, 4 Drawing Sheets

CAPACITIVE TOUCH SYSTEM AND METHOD WITH AUTO-CALIBRATION

BACKGROUND OF THE INVENTION

1. Field of the Invention

The present invention relates generally to touch technology, and more particularly to a capacitive touch system and method with auto-calibration.

2. Description of Related Art

A touch panel may be combined with a display screen to result in a touch screen. Touch screens have been widely used as input interfaces for electronic devices for detecting touch inputs within a display area. The touch technology utilized in the touch panel may be, for example, capacitive, resistive or optical, among which capacitive touch technology is presently the most popular.

A capacitive touch panel is typically made of horizontal electrodes and vertical electrodes, cross points of which are defined as touch points. When the touch panel is operated, an electric field is formed between two electrodes at the touch point. A finger touching the panel blocks some of the electric field, therefore reducing capacitance at the touch point.

Due to processing or packaging diversity, electrical characteristics at the touch points may vary. This diversity may cause a signal to be saturated in an electronic element when the signal is subjected to processing (e.g., amplification). The signal saturation thus makes the measured signals at various touch points indistinguishable, thereby resulting in detection error.

Accordingly, a need has arisen to propose a novel capacitive touch system and method for auto-calibrating diversity among touch points thereby increasing accuracy in touch detection.

SUMMARY OF THE INVENTION

In view of the foregoing, it is an object of the embodiment of the present invention to provide a detect circuit and method, which may be initialized with pre-stored initial values prior to receiving and processing a signal, thereby preventing saturation in the processed signal and enhancing detection accuracy.

According to one embodiment, a capacitive touch system includes a plurality of first electrodes and a plurality of second electrodes, a driving signal generator, an induced signal receiver, a position detector and an initial value generator. Cross points of the first electrodes and the second electrodes define touch points. The driving signal generator is configured to sequentially provide driving signals to the first electrodes, the first electrode to be driven coupling the driving signal according to capacitive coupling effect to generate induced signals on the second electrodes respectively. The induced signal receiver is coupled to receive and process the induced signals. The position detector is configured to detect a position of a touched point according to the driven first electrode and the induced signals in a measuring period. The induced signals associated with at least some no-touch points are measured and pre-stored. The initial value generator generates initial induced signals of the second electrodes at a beginning of a measuring period according to the pre-stored induced signals, and the initial induced signals are then provided to and initialize the induced signal receiver.

One embodiment provides a detect circuit with auto-calibration that includes a signal receiver and an initial value generator. The signal receiver includes at least one detector, each of which being configured to detect a signal in each of at least one measuring period. The initial value generator is configured to measure beforehand and pre-store initial values of at least one said detector in each of at least one measuring period, wherein the initial value generator provides the initial values to the signal receiver according to the pre-stored initial values in order to initialize the signal receiver.

The detect circuit with auto-calibration provided by the embodiment pre-stores the initial value in a digital form, and provides it to the signal receiver in an analog form for performing initialization. Accordingly, the signal receiver may be initialized in a programmable manner such that initialization in each measuring period may be dynamically adjusted.

DETAILED DESCRIPTION OF THE INVENTION

Figure 1:
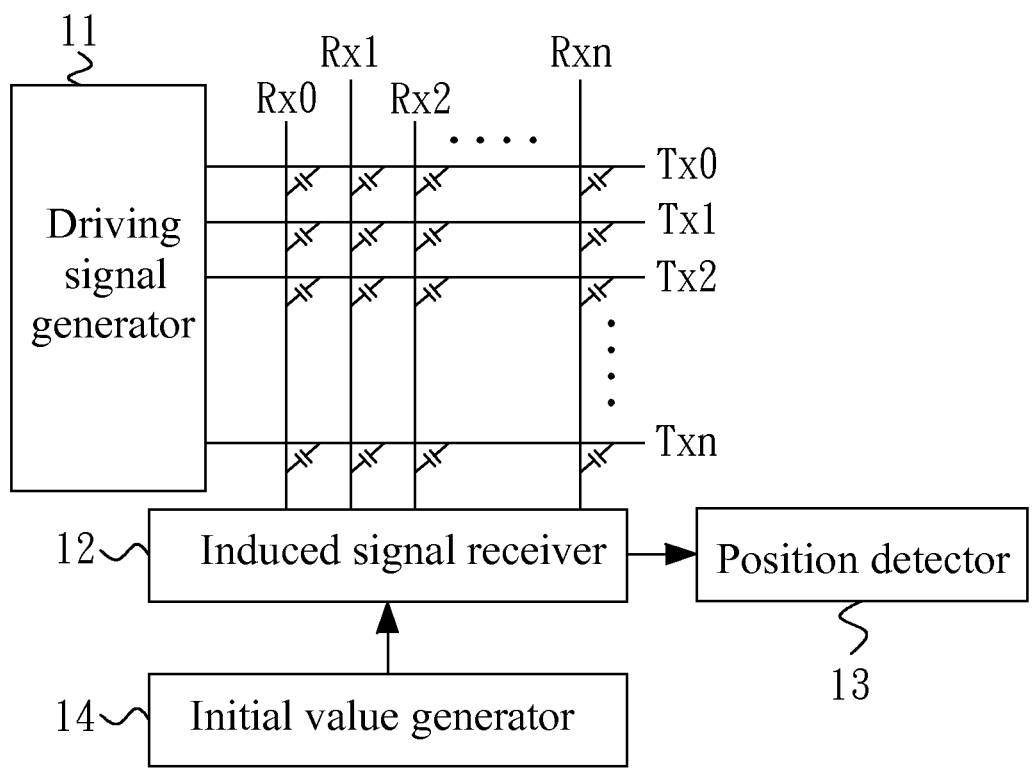
FIG. 1 shows a block diagram of a capacitive touch system with auto-calibration according to one embodiment of the present invention.

FIG. 1 shows a block diagram of a capacitive touch system with auto-calibration according to one embodiment of the present invention. In the embodiment, the capacitive touch system with auto-calibration (or "touch system") includes first electrodes Tx0-Txn arranged horizontally and second electrodes Rx0-Rxn arranged vertically. The first electrodes Tx0-Txn are spaced from the second electrodes Rx0-Rxn with a predetermined distance. A capacitance exists at each touch point where the first electrode Tx and the second electrode Rx cross. The touch system also includes a driving signal generator 11, which provides driving signals to the first electrodes Tx0-Txn sequentially. The driving signal may be an alternating-current (AC) signal (e.g., a pulse signal), which may be a square wave or sinusoidal wave. During a period, the first electrode Tx to be driven couples the driving signal according to capacitive coupling effect, therefore resulting in induced signals on the second electrodes Rx0-Rxn. The induced signals are then received and processed by an induced signal receiver 12. Concurrently, if the first electrode Tx to be driven is touched by a finger or a conductive object (such as a stylus) and the electric field at an associated touch point is affected, an abnormal induced signal will thus be generated on the second electrode Rx at the associated touch point. A measuring period is constructed from the driving signal on the first electrode Tx and the induction on the second electrodes Rx0-Rxn. During each measuring period, the touch system utilizes a position detector 13, such as a microcontroller unit (MCU), to detect the position of a touched point according to the driven first electrode Tx and the second electrode Rx associated with the abnormal induced signal. For example, a centroid position may be determined according to differences between an induced signal associated with a non-touch point and the abnormal induced signal associated with the touched point.

According to one aspect of the embodiment, considering that processing or packaging diversity may cause different capacitive coupling, thereby affecting the formation of the induced signals among the touch points, in the embodiment, the induced signals associated with no-touch points are measured beforehand (e.g., prior to leaving the factory) and are pre-stored, for example, in a non-volatile memory. When the touch system is operated, at the beginning of each measuring period, an initial value generator 14 generates initial induced signals of the second electrodes Rx0-Rxn according to the pre-stored induced signals. The generated initial induced signals are then provided to the induced signal receiver 12, thereby initializing the induced signal receiver 12. After the induced signals are generated on the second electrodes Rx0-Rxn, the induced signals are therefore compensated by the initial induced signals, and each touch point is thus calibrated. For example, prior to leaving the factory, an initial value of 1 volt is obtained after integrating an induced signal measured at a no-touch point. When the touch system is operated, the initial value generator 14 provides −1 volt to the induced signal receiver 12. After the induced signal is generated on the second electrode Rx, the induced signal is therefore compensated by the provided initial value (e.g., −1 volt). It is noted that the initial value discussed above may be a positive or a negative value.

Figure 2:
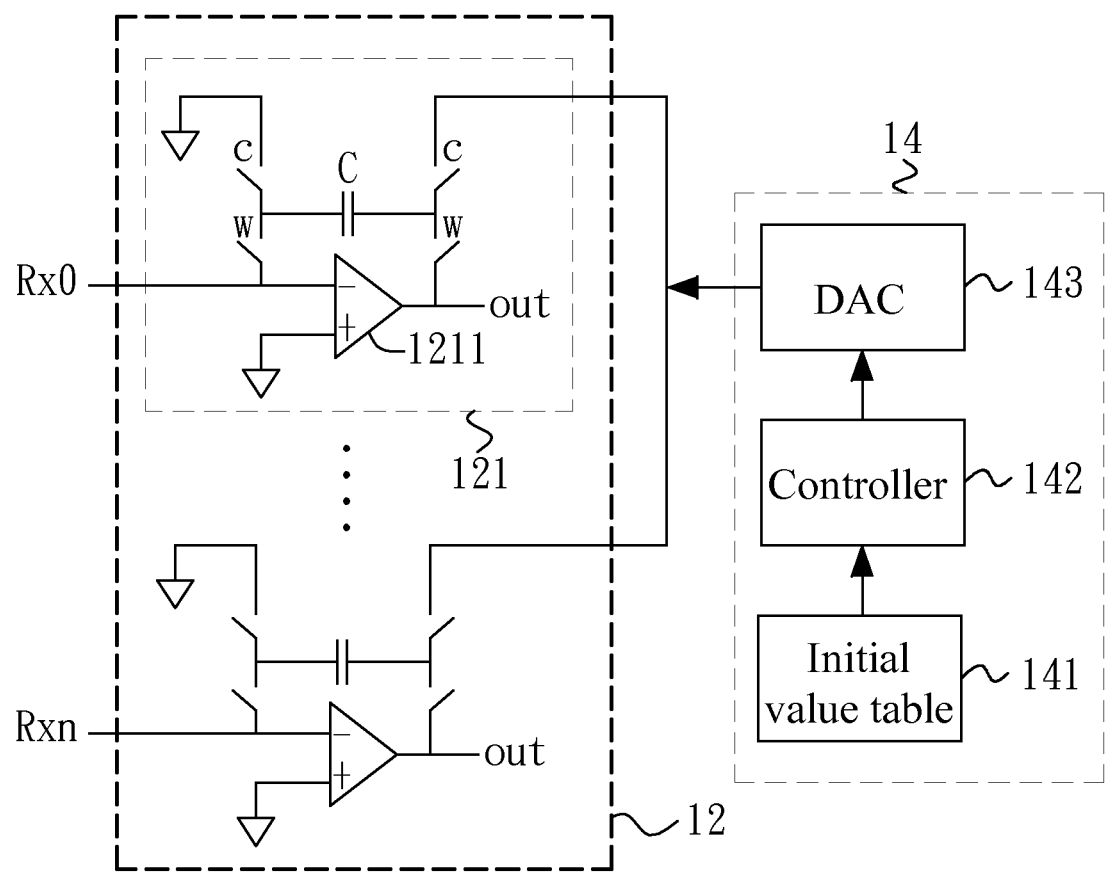
FIG. 2 shows a detailed circuit and block diagram of the induced signal receiver and the initial value generator of FIG. 1.

FIG. 2 shows a detailed circuit and block diagram of the induced signal receiver 12 and the initial value generator 14 of FIG. 1. In the embodiment, the induced signal receiver 12 includes a plurality of integrators 121 with inputs electrically coupled to the second electrodes Rx0-Rxn (or channels), respectively, and with outputs forwarding to the position detector 13 (not shown in FIG. 2). Specifically, the integrator 121 primarily includes an amplifier 1211 and an integrating capacitor C. In one embodiment, the amplifier 1211 comprises an operational amplifier, but one skilled in the art will appreciate that other devices may be used. The integrating capacitor C is controllably coupled between an (inverting) input node and an output node of the amplifier 1211. The integrator 121 also includes a plurality of integrating switches w and initialization switches c. As shown in FIG. 2, during integration, the integrating switches w are closed and the initialization switches c are open. One skilled in the art will appreciate that the switches may be controlled by a microcontroller unit, so that the integrating capacitor C is electrically coupled between the (inverting) input node and the output node of the amplifier 1211, to obtain an integrated induced signal. During initialization, the integrating switches w are open and the initialization switches c are closed, so that the integrating capacitor C is electrically coupled between the initial value generator 14 and a reference potential (e.g., ground), therefore pre-charging the integrator 121 to initialize the integrator 121. It is noted that the integrating capacitor C is charged from one electrode near the output node of the amplifier 121 during initialization, while the integrating capacitor C is charged from another electrode near the (inverting) input node of the amplifier 121 during integration. With respect to the integrated induced signal generated by the integrator 121, the integrator 121 performs initialization according to the initial values provided by the initial value generator 14, and accordingly generates a negative counterpart of the initial value. Further, prior to initialization, a reset switch (not shown) is usually used to discharge the integrating capacitor C.

In the embodiment, the initial value generator 14 includes an initial value table 141, which may be stored in a memory such as a non-volatile memory. In one exemplary embodiment, the initial value table 141 stores initial values of all touch points of the touch system. In another exemplary embodiment, the initial value table 141 stores initial values of partial touch points associated with the first electrodes Tx0-Txn corresponding to each second electrode Rx. For example, the initial value table 141 stores initial values of touch points associated with every other first electrodes (e.g., odd numbered first electrodes Tx1, Tx3, . . . ). With respect to the initial values of touch points associated with non-stored first electrodes, they may be obtained by interpolation by a controller 142 (e.g., a microcontroller unit) according to neighboring initial values. Accordingly, a great amount of memory can be saved without substantially affecting the touch accuracy.

Subsequently, the controller 142 forwards the initial values (or the initial values obtained by interpolation) to a digital-to-analog converter (DAC) 143, which converts the (digital) initial values into analog initial values, which are then fed to the integrators 121 sequentially to perform the initialization for the integrators 121.

Figure 3A:
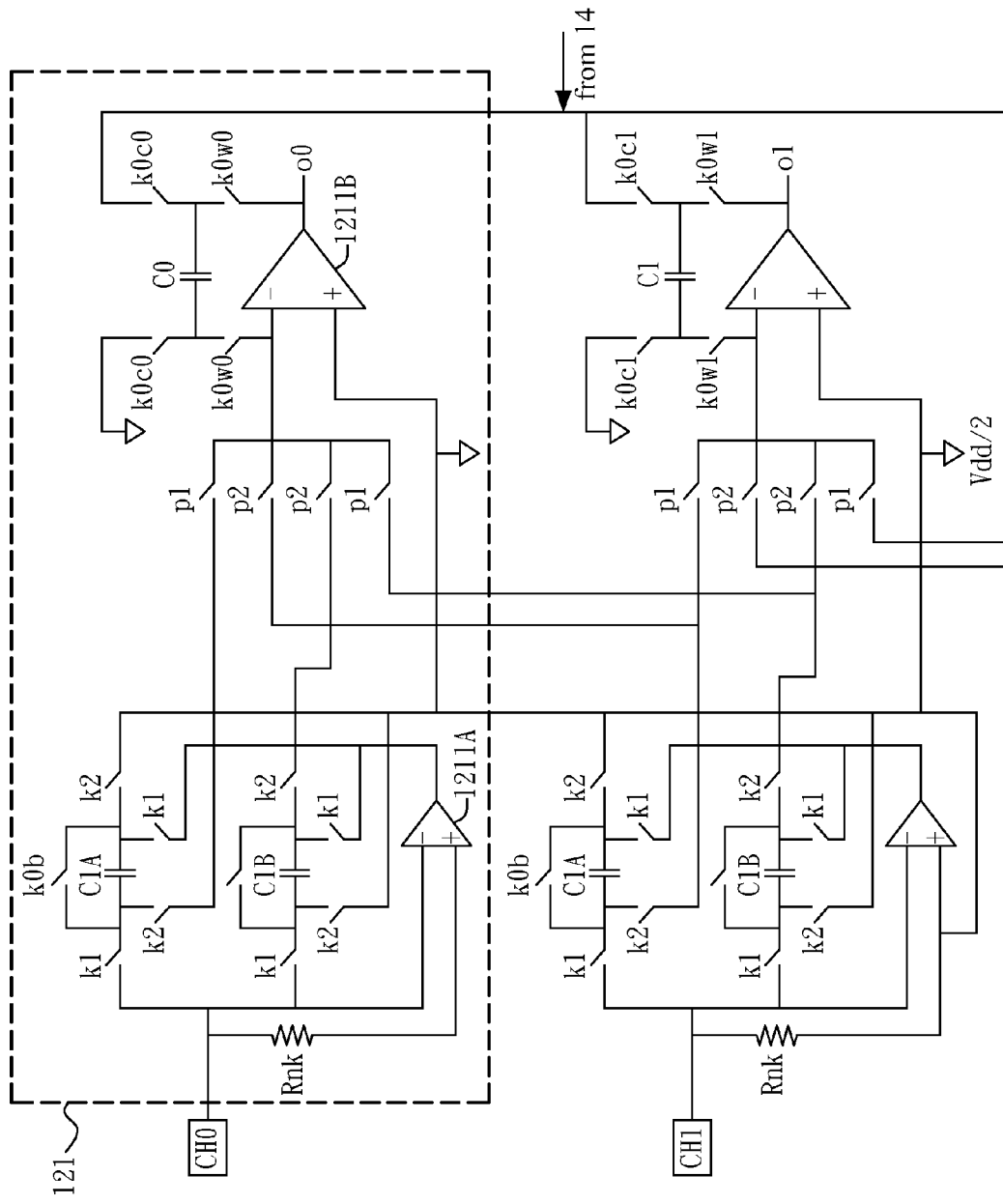
FIG. 3A shows a detailed circuit of the induced signal receiver according to another embedment of the present invention.
Figure 3B:
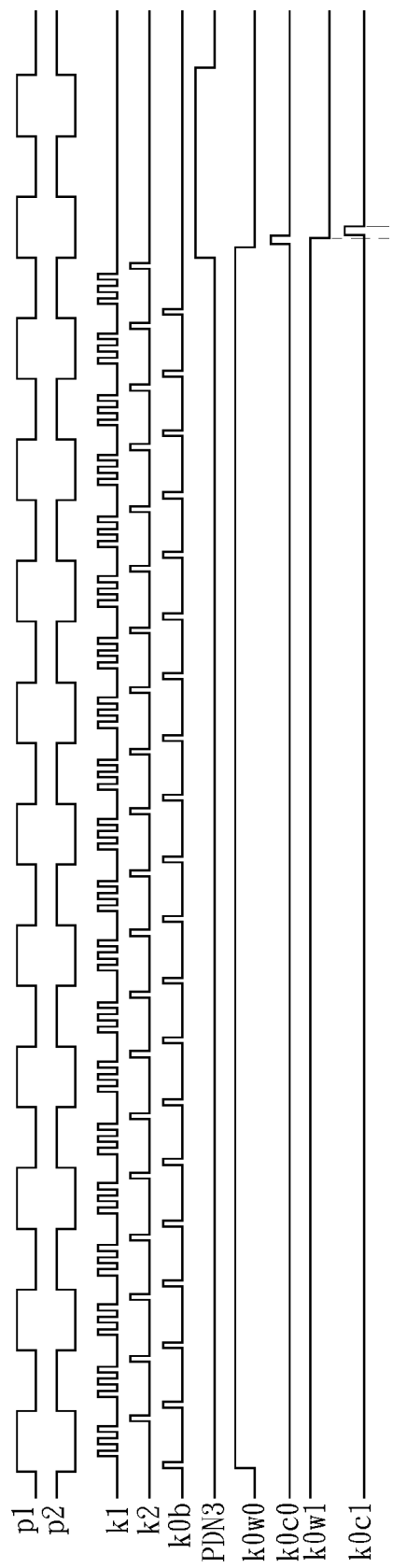
FIG. 3B shows pertinent timing diagrams of FIG. 3A.

As described above, the induced signal receiver 12 is electrically coupled with the second electrodes Rx0-Rxn (or channels) in order to process the induced signals. Taking the embodiment illustrated in FIG. 2 as an example, the integrators 121 directly receive and process the induced signals of the second electrodes Rx0-Rxn. FIG. 3A shows a detailed circuit of the induced signal receiver 12 according to another embedment of the present invention, and FIG. 3B shows pertinent timing diagrams of FIG. 3A. Only two channels CH0 and CH1 are shown in the figures for simplicity. In the embodiment, the induced signals of the second electrodes Rx0-Rxn are indirectly received and processed. In other words, derived induced signals of the second electrodes Rx0-Rx1 are received and processed.

The integrators 121 of the embodiment use integrating switches K0w0/k0w1 and initialization switches k0c0/k0c1 for switching the integrators 121 between integration and initialization. Their operations are the same as those in the previous embodiment, and are thus omitted for brevity. The integration of the present embodiment is performed in two stages. In the first integration stage, in which switches p1 are closed (and switches p2 are open), a first amplifier 1211A and a first capacitor C1A of the first channel CH0 perform integration a couple of times (e.g., three times) via switches k1, resulting in a first integrated result, which is then fed to a second amplifier 1211B via switches k2 for performing second integration. Concurrently, a first amplifier 1211A and a first capacitor C1B of the second channel CH1 perform integration a couple of times via the switches k1, resulting in a first integrated result, which is then fed to a second amplifier 1211B via switches k2 for performing second integration. Accordingly, an induced signal difference in fact is fed to the second amplifier 1211B. Similarly, in the second integration stage, in which the switches p2 are closed (and the switches p1 are open), an induced signal difference in fact is fed to the second amplifier 1211B. As the induced signal receiver 12 of the embodiment processes the induced signal difference between adjacent channels, instead of the induced signal itself from a single channel, the system is therefore capable of alleviating effects caused by external noise (e.g., noise generated from a display panel). Moreover, a shielding layer typically disposed between the touch panel and the display panel may be omitted, thereby reducing thickness and its associated cost of the touch system.

For the foregoing, the embodiment of the present invention provides a detect circuit with auto-calibration, which includes a signal receiver and an initial value generator. The signal receiver includes at least one detector, each of which detects an induced signal in each of at least one measuring period. The detector may be implemented by the aforementioned integrator or other electrical signal measuring circuits for detecting a received signal. The signal receiver may be adapted to detect the aforementioned induced signals or other electrical signals to be measured. Further, the detector may be coupled to the same or different circuits within different measuring periods. For example, if the detector is not capable of performing the entire detection in a single measuring period, the detector may be configured to perform one part at a time through several measuring periods. For another example, the detector may be coupled to the same circuit in different measuring periods. For a further example, the detector may be configured to detect induced signals of the same second electrode with respect to different first electrodes in different measuring periods.

As described above, the initial value generator measures beforehand and pre-stores at least some initial values in each of at least one measuring period, and provides the initial values to the signal receiver in order to initialize the signal receiver. Each initial value is pre-stored in digital form, but is provided to the signal receiver in analog form. Further, the initial values of at least some detectors are generated according to the signal detected in each of at least one measuring period. For example, the driving signal provided to different first electrode corresponds to different measuring period, and the initial value is generated according to corresponding induced signal.

In addition, the initial value generator pre-stores initial values of some detectors in each of at least one measuring period, and the initial values not stored in the initial value table are obtained by interpolation and then provided to the signal receiver.

Although specific embodiments have been illustrated and described, it will be appreciated by those skilled in the art that various modifications may be made without departing from the scope of the present invention, which is intended to be limited solely by the appended claims.

What is claimed is:

1. A capacitive touch system with auto-calibration, comprising:
   a plurality of first electrodes and a plurality of second electrodes, cross points of which are defined as touch points;
   a driving signal generator configured to provide driving signals to the first electrodes, the first electrodes to be driven coupling the driving signal according to capacitive coupling effect to generate induced signals on the second electrodes respectively;
   an induced signal receiver coupled to receive and process the induced signals;
   a position detector, coupled to the induced signal receiver, configured to detect a position of a touched point according to a driven first electrode and the induced signals in a measuring period; and
   an initial value generator, coupled to the induced signal receiver, in which induced signals associated with at least some no-touch points are measured and pre-stored, wherein the initial value generator generates initial induced signals of the second electrodes at a beginning of a measuring period according to the pre-stored induced signals, and the initial induced signals are provided to initialize the induced signal receiver;
   wherein the induced signal receiver comprises a plurality of integrators with inputs electrically coupled to the second electrodes respectively, and with outputs electrically coupled to the position detector, wherein the integrators comprising at least a first integrator and a second integrator adjacent to the first integrator each comprises:
   a first amplifier;
   a second amplifier;
   a first integrating capacitor controllably connected between an inverting input node and an output node of the first amplifier, and controllably connected between an inverting input node of the second amplifier and ground;
   a second integrating capacitor controllably connected between the inverting input node and the output node of the first amplifier, and controllably connected between the inverting input node of the second amplifier and ground, wherein the inverting input nodes of the first integrator and the second integrator are controllably connected;
   a third integrating capacitor controllably connected between the inverting input node and an output node of the second amplifier;
   wherein, with respect to the first integrator, in a first integration stage, the first integrating capacitor is connected to the first amplifier to perform integration a couple of times, resulting in a first integrated result, which is fed to the second amplifier of the first integrator in a second integration stage, in which the third integrating capacitor is connected to the second amplifier to perform integration;
   concurrently, with respect to the second integrator, in the first integration stage, the second integrating capacitor is connected to the first amplifier to perform integration a couple of times, resulting in a second integrated result, which is fed to the second amplifier of the first integrator in the second integration stage, thereby resulting in an induced signal difference between the first integrator and the second integrator.

2. The system of claim 1, wherein the initial value generator comprises:
   an initial value table configured to store initial values of at least some of the touch points;
   a digital-to-analog converter (DAC) configured to convert the initial value from a digital form to an analog form, and the converted initial values are fed to initialize the integrators; and
   a controller configured to forward the initial values to the DAC.

3. The system of claim 2, wherein initial values of the touch points not stored in the initial value table are obtained by the controller through interpolation according to the initial values stored in the initial value table.

4. The system of claim 2, wherein the initial value table is stored in a non-volatile memory.

* * * * *